United States Patent
Grundy

(10) Patent No.: US 6,276,023 B1
(45) Date of Patent: Aug. 21, 2001

(54) GRILL CLEANING BRUSH

(76) Inventor: Sharon Grundy, 64 Kings Hwy., Groton, CT (US) 06340

( * ) Notice: Subject to any disclaimer, the term of this patent is extended or adjusted under 35 U.S.C. 154(b) by 0 days.

(21) Appl. No.: 09/510,891

(22) Filed: Feb. 23, 2000

(51) Int. Cl.[7] .............................. A47L 17/00; A47L 13/12
(52) U.S. Cl. .......................... 15/244.1; 15/210.1; 15/118
(58) Field of Search ....................... 15/111, 118, 229.13, 15/244.1, 244.2, 210.1

(56) References Cited

U.S. PATENT DOCUMENTS

| | | | |
|---|---|---|---|
| D. 307,077 | * | 4/1990 | Bryant . |
| D. 358,491 | * | 5/1995 | Hoagland . |
| 2,975,454 | * | 3/1961 | Bernstein ............................. 15/244.2 |
| 3,317,944 | * | 5/1967 | Napier, Sr. ........................... 15/244.1 |
| 3,465,377 | * | 9/1969 | Thomas ............................... 15/244.1 |
| 3,939,522 | * | 2/1976 | Shimizu .............................. 15/244.1 |
| 4,056,863 | * | 11/1977 | Gunjian . |
| 4,083,078 | * | 4/1978 | Shimizu .............................. 15/244.1 |
| 4,091,579 | * | 5/1978 | Giangiulio . |
| 4,146,943 | * | 4/1979 | Wertheimer . |
| 4,286,349 | * | 9/1981 | Dugrenier . |
| 5,373,600 | * | 12/1994 | Stojanovski . |
| 5,479,673 | * | 1/1996 | Carton . |
| 5,924,460 | * | 7/1999 | Jones . |

FOREIGN PATENT DOCUMENTS

1033314 * 6/1966 (GB) ................................. 15/244.2

* cited by examiner

Primary Examiner—Randall E. Chin
(74) Attorney, Agent, or Firm—John D. Gugliotta; Michael J. Corrigan

(57) ABSTRACT

The invention is a grill cleaning brush to aid in the cleaning of table top grill surfaces. Resembling a foam type paint brush, it allows the user to quickly and easily swipe clean the grilling surface on table top type grilling machines. The foam rubber sponge section is provided with cut in grooves or valleys with embedded scouring tips that align with and match the upper contact points or tips of the grill surface.

5 Claims, 2 Drawing Sheets

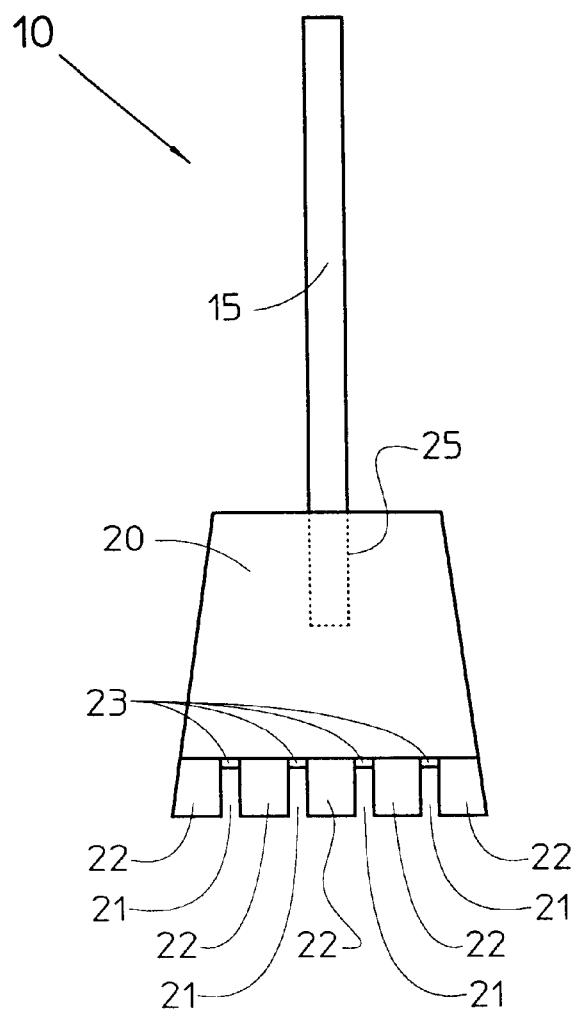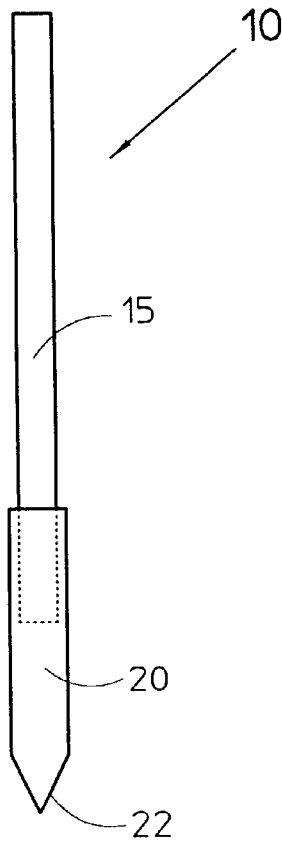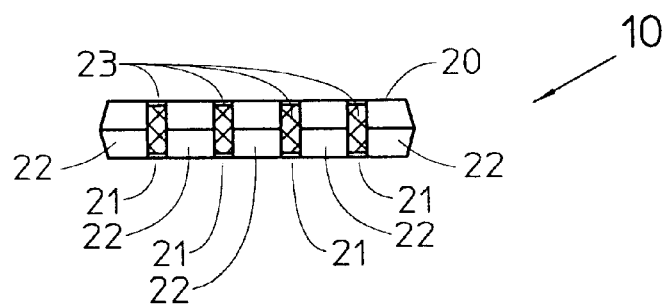

GRILL CLEANING BRUSH

RELATED APPLICATIONS

The present invention was first described in Disclosure Document Number 461238 filed on Aug. 27, 1999. There are no previously filed, nor currently any co-pending applications, anywhere in the world.

BACKGROUND OF THE INVENTION

1. Field of the Invention

The present invention relates generally to barbecue grills and, more particularly, to a grill cleaning brush having specially formed grill cleaning grooves.

2. Description of the Related Art

One particular appliance that has found popularity in recent times is the table top grill. One example of this type grill is the "George Foreman™" grill. These grills allow individuals to cook beef, chicken, vegetables and other food in a fashion that resembles cooking outdoors on a grill. They allow food to remain tasty and juicy while keeping many of the vitamins and nutrients within the food in a very short time. However, some of that time savings is lost due to the increased time it takes to clean such a device. Making matters worse, the "hill and valley" surface of the grill requires almost separate, individual cleaning of each section. In some cases, the grill may not be cleaned adequately enough, leading to safety and health issues the next time it is used to cook something. Accordingly, there exists a need for a means by which table top grills can be quickly and easily cleaned after use. The development of the grill cleaning brush fulfills this need.

In the related art, there exists utility and design patents for a variety of grill cleaning tools including brushes with scrapers, bristles and forks and the like for cleaning between the grill elements. These devices all have limitations in their effectiveness in cleaning between the grill elements. The art was completely devoid of any grill cleaning devices utilizing a sponge rubber head with integral grill rack cleaning grooves which is very effective in cleaning between grill elements. Nor were there any patents which have grill cleaning utensils specifically designed for grill top table and the like as in the present invention.

A search of the prior art did not disclose any patents that read directly on the claims of the instant invention; however, the following references were considered related:

| U.S. Pat. No. | Inventor | Issue Date |
|---|---|---|
| 5,479,673 | Carton | Jan. 2, 1996 |
| 5,373,600 | Stojanovski et al. | Dec. 20, 1994 |
| 4,146,943 | Wertheimer et al. | Apr. 3, 1979 |
| 4,091,579 | Giangiulio | May 30, 1978 |
| D 358,491 | Hoagland | May 23, 1995 |
| D 307,077 | Bryant | Apr. 10, 1990 |
| 4,286,349 | Dugrenier | Sep. 1, 1981 |
| 4,056,863 | Gunjian | Nov. 8, 1977 |
| 5,924,460 | Jones | Jul. 20, 1999 |

Consequently, a need has been felt for providing an apparatus specifically for table top grills and the like which is effective in cleaning between the grill elements.

SUMMARY OF THE INVENTION

It is therefore an object of the present invention to provide an improved grill cleaning brush.

It is another object of the present invention to provide an improved grill cleaning brush for cleaning table top grill surfaces.

It is yet another object of the present invention to provide an improved grill cleaning brush for cleaning table top grill surfaces.

It is yet still another object of the present invention to make grill cleaning quick and easy.

It is another object of the present invention that it has both residential and commercial application.

It is yet another object of the present invention that the grooves cut into the sponge head match the grill line layout.

It is an advantage of the present invention that it works on Joe Foreman™ type grills and others.

It is another advantage of the present invention that it provides a higher quality cleaning job.

It is yet another advantage of the present invention that it can be used with existing cleaners and solvents.

It is yet still another advantage of the present invention that the handle allows greater application of pressure.

It is a benefit of the present invention that it removes all traces of food.

It is another benefit of the present invention that the foam rubber sponge head works great with soap and water.

It is another benefit of the present invention that the foam rubber sponge head is easily replaced when worn.

Briefly described according to one embodiment of the present invention, the grill cleaning brush, as its name implies, is an apparatus to aid in the cleaning of table top grill surfaces. Resembling a foam type paint brush, it allows the user to quickly and easily swipe clean the grilling surface on table top type grilling machines for cleaning or to push grease into the grill's grease collection tray during cooking. The foam rubber sponge section is provided with cut in grooves or valleys that align with and match the upper contact points or tips of the grill surface. In such a manner, continuous contact with the entire surface of the grill is maintained thus allowing for a more complete cleaning job. The invention is intended to be used with soap and water when performing cleaning of the grill surface after use. The use of the grill cleaning brush allows users of table top grills the ability to quickly and effectively clean the cooking surface of the grill in a manner that matches the convenience and time savings of the grill itself.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2 is a front view of the grill cleaning brush, according to the preferred embodiment of the present invention;

FIG. 3 is a side view of the grill cleaning brush, according to the preferred embodiment of the present invention; and FIG. 4 is a bottom view of the grill cleaning brush, according to the preferred embodiment of the present invention.

Figure 1:
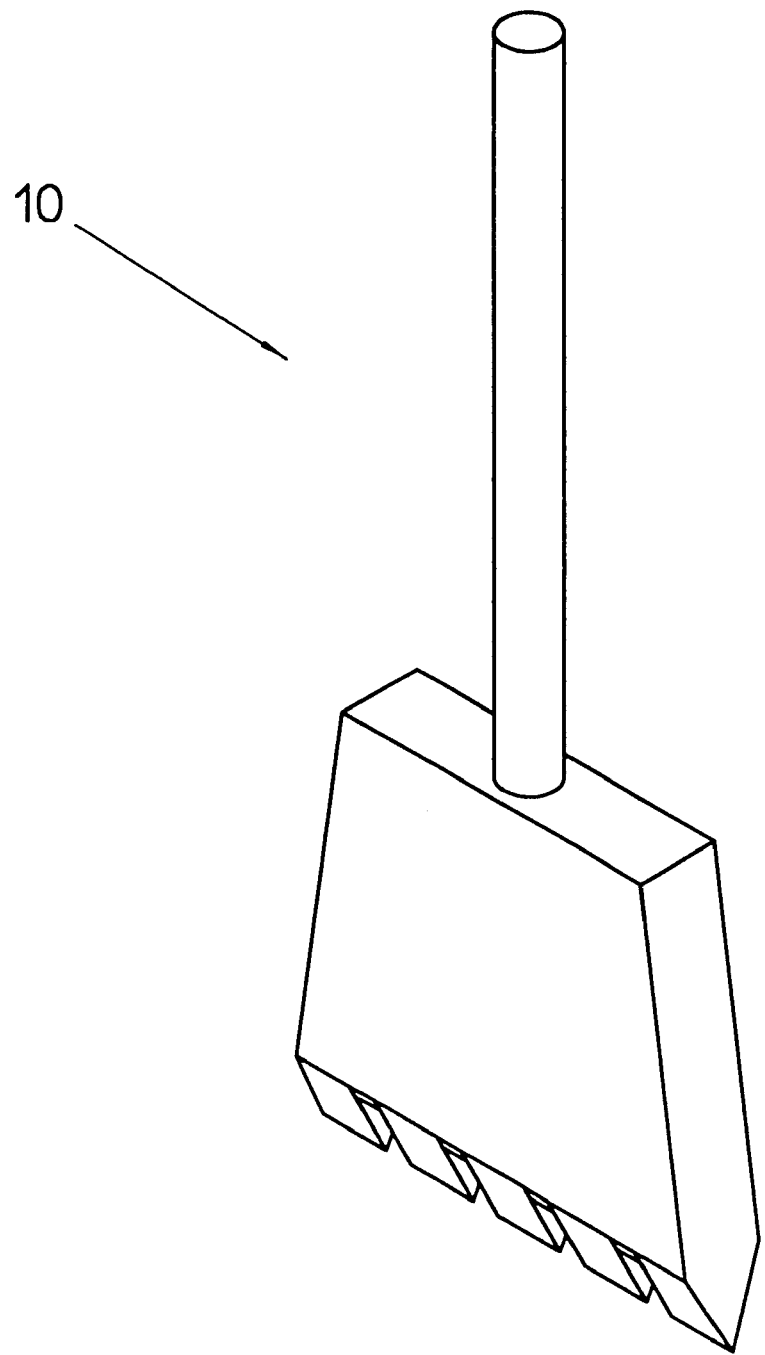
FIG. 1 is a perspective view of the grill cleaning brush, according to the preferred embodiment of the present invention.

| LIST OF REFERENCE NUMBERS | | | |
|---|---|---|---|
| 10 | Grill Cleaning Brush | 22 | Tines |
| 15 | Handle | 23 | Scouring Tips |
| 20 | Spnge Head | 25 | Attachment Means |
| 21 | Grooves | | |

DESCRIPTION OF THE PREFERRED EMBODIMENTS

The best mode for carrying out the invention is presented in terms of its preferred embodiment, herein depicted within FIGS. 1–4.

1. Detailed Description of the Figures

Referring now to FIGS. 1 through 4, shown is a grill cleaning brush, according to the present invention, for cleaning the top of and between the elongated wire sections forming the upper grill surface of grills typically found on table top grilling machines and the like. Such grills are typically composed of the elongated wire sections spaced parallel to each other wherein the ends are welded to a square, rectangular or round wire frame. The frame is then dropped onto a rim located on the upper perimeter of the grill housing. In this manner, food items can be suspended over glowing charcoal briquettes or gas or electric burners. The grill cleaning brush 10 is composed of a wedge-shaped sponge head 20 mounted on a first end of an elongated handle 15 via an attachment means 25. Wedge-shaped sponge head 20 has a lower edge, an upper edge, a first side, and a second side. A hook or loop can be attached at a second end of handle 15 to allow the grill cleaning brush to be hung on a wall on a nail and the like. Attachment means 25 can be one of many known construction methods such as where handle 15 is fitted in a specially formed aperture in the bottom of sponge head 20 in a semi-interference type fit arrangement. Adhesive may also be added to make the attachment permanent. This disclosure is meant only as a suggestion and in no way implies on limitation on the attachment means 25. FIG. 2 shows the specially formed shape of sponge head 25 wherein a plurality of equally spaced grooves 21 and tines 22 are cut into the lower edge of sponge head 25.

The final design of the grill cleaning brush 10 will depend on the particular make and model of table top grill because the distance between the elongated wire sections varies from grill to grill. However, it has been found that the following dimensions work well with many of the popular table top grill styles. Typically, handle 15 is of an elongated cylindrical shape being approximately ⅝" in diameter and 6" to 8" in length. Handle 15 may be formed out of any suitable material such as a wood or plastic dowel rod. The lower edge of sponge head 20 is 4" wide while its upper edge is 3" wide. The plurality of grooves cut into the lower edge of sponge head 20 are approximately ¼" wide and spaced at a distance of ⅝" from each other. The first groove inward from the first side and the second side of said wedge-shaped sponge head 20 along the lower edge of are formed ⅝" inward. Scouring tips 23 are then fastened on the upper edge of each groove 23 to aid in the cleaning process. Scouring tips 23 are cut from sheets of readily available fibrous scouring pads and are attached via adhesive. Sponge head 20 is approximately ½" to ¾" wide and is tapered to a point at the lower edge as shown in FIG. 3. Sponge head 20 is made from a sponge rubber material having both elastic and porous qualities with the final choice to be selected after design testing is completed. The construction material and dimensions are only meant as suggestions and in no way imply any limitations on the final design of grill cleaning brush 10. FIG. 4 shows a bottom view of grill cleaning brush 10 showing the detail of the spacing of the plurality of grooves 21 and tines 22.

2. Operation of the Preferred Embodiment

To use the present invention, the foam rubber sponge section with cut in grooves or valleys is aligned with the upper contact points or tips of the grill surface and dragged back and forth over the grill surface. In this manner, grease can be pushed into the grease collection tray usually provided with such grills or to clean the grill until it is clean. Soap and water can also be used in conjunction with the grill brush when performing cleaning of the grill surface. The grill brush can then be cleaned with soap and water and stored until the next use.

The foregoing description is included to illustrate the operation of the preferred embodiment and is not meant to limit the scope of the invention. The scope of the invention is to be limited only by the following claims.

What is claimed is:

1. A grill cleaning brush for cleaning table top grills, comprised of:

a wedge-shaped sponge head, said wedge-shaped sponge head having a plurality of equally spaced grooves and tines cut into a lower edge for engaging the elongated wire sections of said grill, an upper edge, a first side, and a second side, wherein said wedge-shaped sponge head is approximately ½" to ¾" wide and is tapered to a point at said lower edge;

an elongated handle, said elongated handle having a first end and a second end;

an attachment means, said attachment means for attaching said wedge-shaped sponge head to said first end of said elongated handle, wherein said attachment means used to attach said handle to said wedge-shaped sponge head consist of fitting said handle in an aperture in the bottom of said wedge-shaped sponge head in a semi-interference arrangement.

2. The grill cleaning brush for cleaning table top grills of claim 1, further comprising an attachment means formed of hook or loop can be attached at the second end of said handle to allow said brush to be hung on a wall on a nail.

3. The grill cleaning brush for cleaning table top grills of claim 2, wherein said handle is of an elongated cylindrical shape being approximately ⅝" in diameter and 6" to 8" in length.

4. The grill cleaning brush for cleaning table top grills of claim 3, wherein the lower edge of said wedge-shaped sponge head is 4" wide while the upper edge is 3" wide, and the plurality of grooves cut into the lower edge of said wedge-shaped sponge head are approximately ¼" wide and spaced at a distance of ⅝" from each other, and a first groove inward from said first side and said second side of said wedge-shaped sponge head along said lower edge are formed ⅝" inward.

5. The grill cleaning brush for cleaning table top grills of claim 4, wherein scouring tips are fastened on the upper edge of each of said plurality of grooves to aid in the cleaning process, said scouring tips being cut from sheets of readily available fibrous scouring pads and are attached via adhesive.

* * * * *